United States Patent
Romer et al.

(10) Patent No.: US 10,018,021 B2
(45) Date of Patent: Jul. 10, 2018

(54) BATTERY-POWERED PUMP FOR REMOVING FLUIDS FROM A SUBTERRANEAN WELL

(71) Applicants: Michael C. Romer, The Woodlands, TX (US); Federico A. Tavarez, Pearland, TX (US)

(72) Inventors: Michael C. Romer, The Woodlands, TX (US); Federico A. Tavarez, Pearland, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 164 days.

(21) Appl. No.: 15/071,893

(22) Filed: Mar. 16, 2016

(65) Prior Publication Data
US 2016/0365738 A1 Dec. 15, 2016

Related U.S. Application Data

(60) Provisional application No. 62/173,194, filed on Jun. 9, 2015.

(51) Int. Cl.
| | |
|---|---|
| *E21B 43/12* | (2006.01) |
| *H02J 7/00* | (2006.01) |
| *F04B 17/03* | (2006.01) |
| *F04B 19/22* | (2006.01) |
| *F04B 49/02* | (2006.01) |
| *F04B 49/20* | (2006.01) |
| *F04D 13/06* | (2006.01) |
| *F04D 15/00* | (2006.01) |

(Continued)

(52) U.S. Cl.
CPC ............ *E21B 43/128* (2013.01); *F04B 17/03* (2013.01); *F04B 19/22* (2013.01); *F04B 47/06* (2013.01); *F04B 49/022* (2013.01); *F04B 49/065* (2013.01); *F04B 49/20* (2013.01); *F04D 13/068* (2013.01); *F04D 13/10* (2013.01); *F04D 15/0066* (2013.01); *H02J 7/0042* (2013.01); *H02J 7/0052* (2013.01)

(58) Field of Classification Search
CPC ....... H02J 7/0042; H02J 7/0052; F04D 13/10; F04D 13/068; F04D 15/0066; F04B 49/065; F04B 47/06; F04B 49/022; F04B 19/22; F04B 17/03; F04B 49/20; E21B 43/128
See application file for complete search history.

(56) References Cited

U.S. PATENT DOCUMENTS

| | | | | |
|---|---|---|---|---|
| 2001/0050173 | A1* | 12/2001 | Head | ..................... E21B 17/003 166/381 |
| 2012/0112924 | A1* | 5/2012 | Mackay | .............. E21B 41/0085 340/854.6 |

(Continued)

*Primary Examiner* — Brad Harcourt
(74) *Attorney, Agent, or Firm* — ExxonMobil Upstream Research Company—Law Department

(57) ABSTRACT

A system for removing fluids from a subterranean well. The system includes a housing comprising a hollow cylindrical body, the hollow cylindrical body having a first end and a second end; a pump for removing fluids from the subterranean well, the pump positioned within the hollow cylindrical body; and a battery-powered driver for driving the pump, the driver positioned within the hollow cylindrical body; and an apparatus for releasably securing and sealing the first end of the housing. A method for removing fluids from a subterranean well is also provided.

35 Claims, 3 Drawing Sheets

(51) Int. Cl.
*F04B 47/06* (2006.01)
*F04B 49/06* (2006.01)
*F04D 13/10* (2006.01)

(56) References Cited

U.S. PATENT DOCUMENTS

2013/0264069 A1* 10/2013 Williamson, Jr. ...... E21B 34/06
166/373
2013/0277065 A1* 10/2013 Hallundbæk ......... E21B 43/128
166/372
2017/0016293 A1* 1/2017 Thomas .................. E21B 23/01

* cited by examiner

BATTERY-POWERED PUMP FOR REMOVING FLUIDS FROM A SUBTERRANEAN WELL

CROSS REFERENCE TO RELATED APPLICATIONS

This application claims the priority and benefit of U.S. Provisional Application No. 62/173,194, filed Jun. 9, 2015, the disclosure of which is incorporated herein by reference in its entirety.

FIELD

The present disclosure relates to systems and methods for removing fluids from subterranean wells, and more particularly to such systems and methods employing rechargeable-battery-powered pump drivers.

BACKGROUND

Over time, hydrocarbon-producing wells, such as gas, condensate, or oil producing wells, sometimes tend to "load up" with produced or condensed water. The water creates a hydrostatic head or backpressure on the producing formation, resulting in an impediment to well-flow and may reduce or stop hydrocarbon production. A common, cost-effective method of dealing with this issue in many gas wells is to implement a plunger lift system. Plunger lift takes advantage of a forced pressure differential between the casing and tubing, created by shutting a well in and then actuating a surface valve, to periodically remove water from a well.

While such plunger-based systems can be effective, they are dependent on reservoir pressure and can only remove a limited amount of liquid per day from a shallow depth. A pump is typically employed for deliquification when water volumes are high, the candidate well too deep, or reservoir pressure too low for a plunger application. Common pump types include rod pumps, electric submersible pumps, and hydraulic pumps. As may be appreciated by those skilled in the art, these pump types all suffer from reliability issues and considerable installation and deployment costs, since a workover rig is typically required for intervention. Similar issues are encountered with horizontal shale oil wells, since lower liquid production rates, high gas cuts, and tortuous wellbore trajectories tend to decrease the pump run lives achieved. These issues can make economical hydrocarbon production virtually impossible.

Therefore, what is needed are pumping systems and methods that are more cost-effective to deploy and replace and more resistant to deviated and tortuous trajectories.

SUMMARY

In one aspect, disclosed herein is a system for removing fluids from a subterranean well. The system includes a housing comprising a hollow cylindrical body, the hollow cylindrical body having a first end and a second end; a pump for removing fluids from the subterranean well, the pump positioned within the hollow cylindrical body; and a battery-powered driver for driving the pump, the driver positioned within the hollow cylindrical body.

In some embodiments, the system also includes a rechargeable battery for powering the driver, the rechargeable battery positioned within the hollow cylindrical body; and an apparatus for releasably securing and sealing the first end of the housing. In some embodiments, the apparatus may be positioned within a tubular of the subterranean well, the tubular providing a conduit for conveying wellbore fluids and the housing and related pumping system components as taught herein, between a surface location of the well and a downhole location of the well, such as the pump setting depth where the pump positioning apparatus may be located.

In some embodiments, the system also includes a battery recharging station, the battery recharging station positioned up-hole from the normal pumping depth of the system, such as at a position up-hole in the well bore (such as a depth intermediate the producing pump depth and the well surface, or above-ground surface, or above-water, or near the seafloor), and the battery recharging station is in communication with the tubular conveying the pumping system housing and the produced fluids. The battery recharging station may be positioned, structured, and arranged to temporarily and intermittently receive the housing when the housing is disengaged from the pump positioning (setting or locating) apparatus. The battery recharging station may selectively or automatically release or otherwise separate the recharging station from the housing after charging the battery for the housing containing the recharged battery to return to the pumping system positioning apparatus.

In some embodiments, the system also includes a mobile charging unit, for example, a vehicle with electrical generation capabilities, to recharge the battery through a recharging station, as needed.

In some embodiments, the system also includes at least one sensor for monitoring system conditions including the level of charge of the rechargeable battery.

In some embodiments, the system also includes a communications system for transmitting data obtained from the at least one sensor.

In some embodiments, the system also includes a surfacing system for raising the housing to a position within the battery recharging station when the housing is disengaged from the pump positioning apparatus.

In some embodiments, the housing is disengaged from the pump positioning apparatus in response to a signal received from the at least one sensor that the rechargeable battery has reached a predetermined level of discharge.

In some embodiments, the pump is a positive-displacement pump.

In some embodiments, the pump is other than a positive-displacement pump.

In some embodiments, the subterranean well further includes a casing, the tubular positioned within the casing to form an annulus for producing gas therethrough, with liquids removed by the pump through the tubular.

In some embodiments, the system also includes a standing valve, the standing valve positioned within the tubular to retain liquids within the tubular.

In some embodiments, the rechargeable battery is selected from lithium-ion, lithium-air, lithium-seawater, or an engineered combination of battery chemistries.

In some embodiments, the rechargeable battery comprises a plurality of individual batteries.

In some embodiments, the driver comprises an electric motor.

In some embodiments, the at least one sensor for monitoring system conditions includes a sensor for monitoring downhole pressure, and a sensor for monitoring downhole temperature.

In some embodiments, the downhole pressure sensor provides a signal to a pump-off controller.

In some embodiments, the at least one sensor provides a signal to the pump to change its operating speed to maintain an optimal fluid level above the pump.

In some embodiments, the communications system transmits performance information to a supervisory control and data acquisition (SCADA) system.

In some embodiments, the surfacing system is structured and arranged to raise and lower the density of the housing. In some embodiments, the surfacing system comprises a buoyancy system.

In some embodiments, the apparatus and methods may be used in conjunction with producing hydrocarbons from the well, including harvesting the hydrocarbons obtained therefrom and the removal of production by-products such as water to enable the production of hydrocarbons from the well.

In some embodiments, the surfacing system comprises a propeller system or jetting device.

In some embodiments, the rechargeable battery can be recharged via a downhole wet-mate connection attached to a wireline having multiple electrical conductors, or a slickline with a larger power-source battery attached to the wet-mate.

In some embodiments, the wireline, slickline, or power required for recharging, can be supplied by a mobile cable spooling or charging unit.

In another aspect, disclosed herein is a method of removing fluids from a subterranean well, the subterranean well comprising a tubular positioned within a casing to form an annulus. The method includes: positioning a housing within the tubular, the housing comprising a hollow cylindrical body, the hollow cylindrical body having a first end and a second end; a pump positioned within the hollow cylindrical body; and a battery-powered driver for driving the pump, the driver positioned within the hollow cylindrical body; engaging the first end of the housing with an apparatus for securing and sealing the housing; and removing fluids from the subterranean well.

In some embodiments, the housing further comprises a rechargeable battery for powering the driver, the rechargeable battery positioned within the hollow cylindrical body.

In some embodiments, the apparatus is structured and arranged to releasably engage the first end of the housing.

In some embodiments, the housing further comprises at least one sensor for monitoring at least the level of charge of the rechargeable battery.

In some embodiments, the housing further comprises a communications system for transmitting data obtained from the at least one sensor.

In some embodiments, the housing further comprises a surfacing system for raising the housing to a battery recharging station when the housing is disengaged from the apparatus.

In some embodiments, the system also includes a mobile charging unit, such as a vehicle with electrical generation capabilities, to recharge the battery through a recharging station, as needed.

In some embodiments, the method also includes receiving a signal from the at least one sensor that the rechargeable battery has reached a predetermined level of discharge; and disengaging the housing from the apparatus in response thereto.

In some embodiments, the method also includes moving the housing within the wellbore such as raising the housing to a shallower depth within the wellbore or raising the housing to the surface or to the seafloor, to a battery recharging station, the battery recharging station positioned above-ground (including subsea) and in communication with the tubular.

In some embodiments, the method also includes returning the housing to the apparatus upon charging the rechargeable battery and engaging the first end of the housing with the apparatus.

In some embodiments, the rechargeable battery is selected from lithium-ion, lithium-air, lithium-seawater, or an engineered combination of battery chemistries. Certainly other battery technologies may also be used to store charge to run the motor.

In some embodiments, the driver comprises an electric motor.

In some embodiments, the rechargeable battery can be recharged via a downhole wet-mate connection attached to a wireline having multiple electrical conductors, or a slickline with a larger power-source battery attached to the wet-mate.

In some embodiments, the wireline or slickline, or power required for recharging, can be supplied by a mobile cable spooling and/or charging unit.

DETAILED DESCRIPTION

Figure 1:
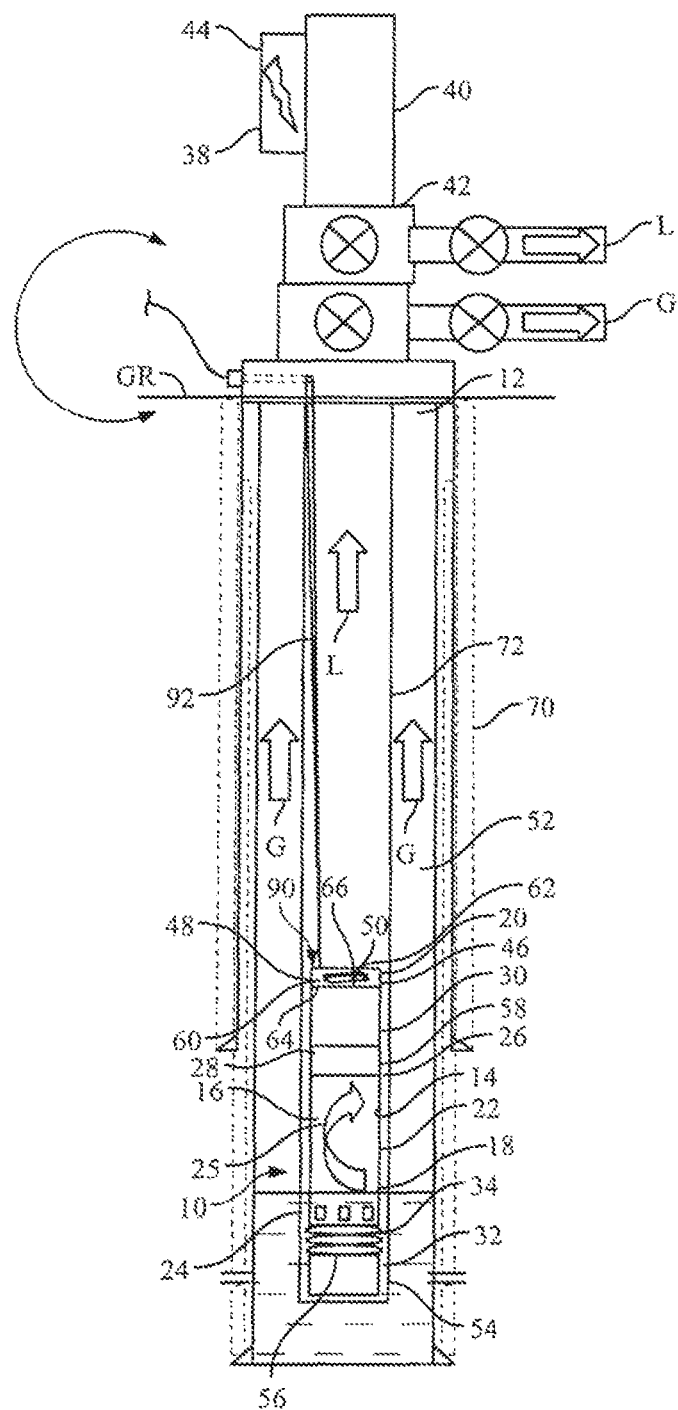
FIG. 1 presents a schematic view of an illustrative, nonexclusive example of a system for removing fluids from a subterranean well, depicted in a pumping mode, according to the present disclosure.
Figure 2:
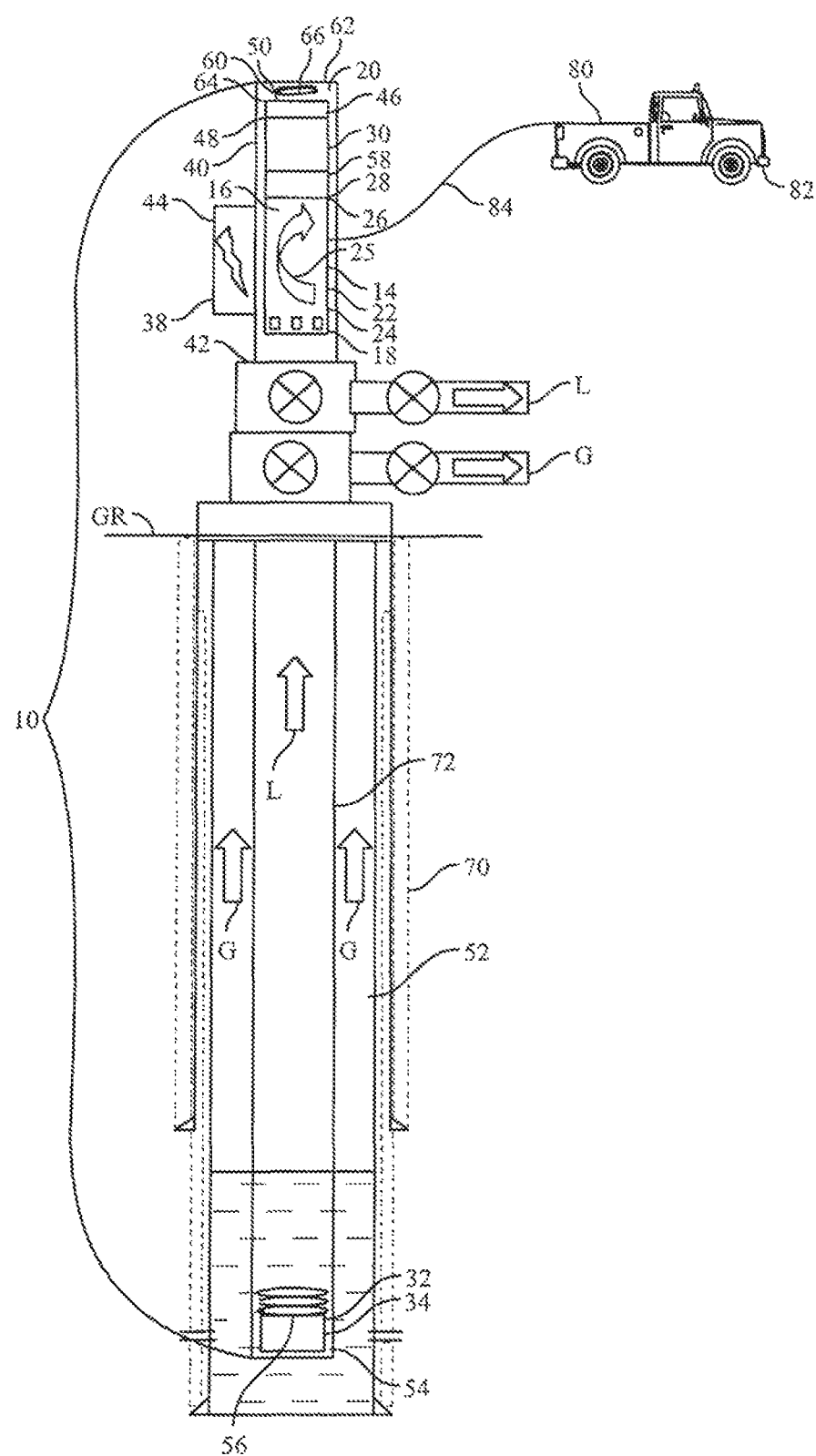
FIG. 2 presents a schematic view of an illustrative, nonexclusive example of the system for removing fluids from a subterranean well of FIG. 1, wherein the system is placed in the charging mode, according to the present disclosure.
Figure 3:
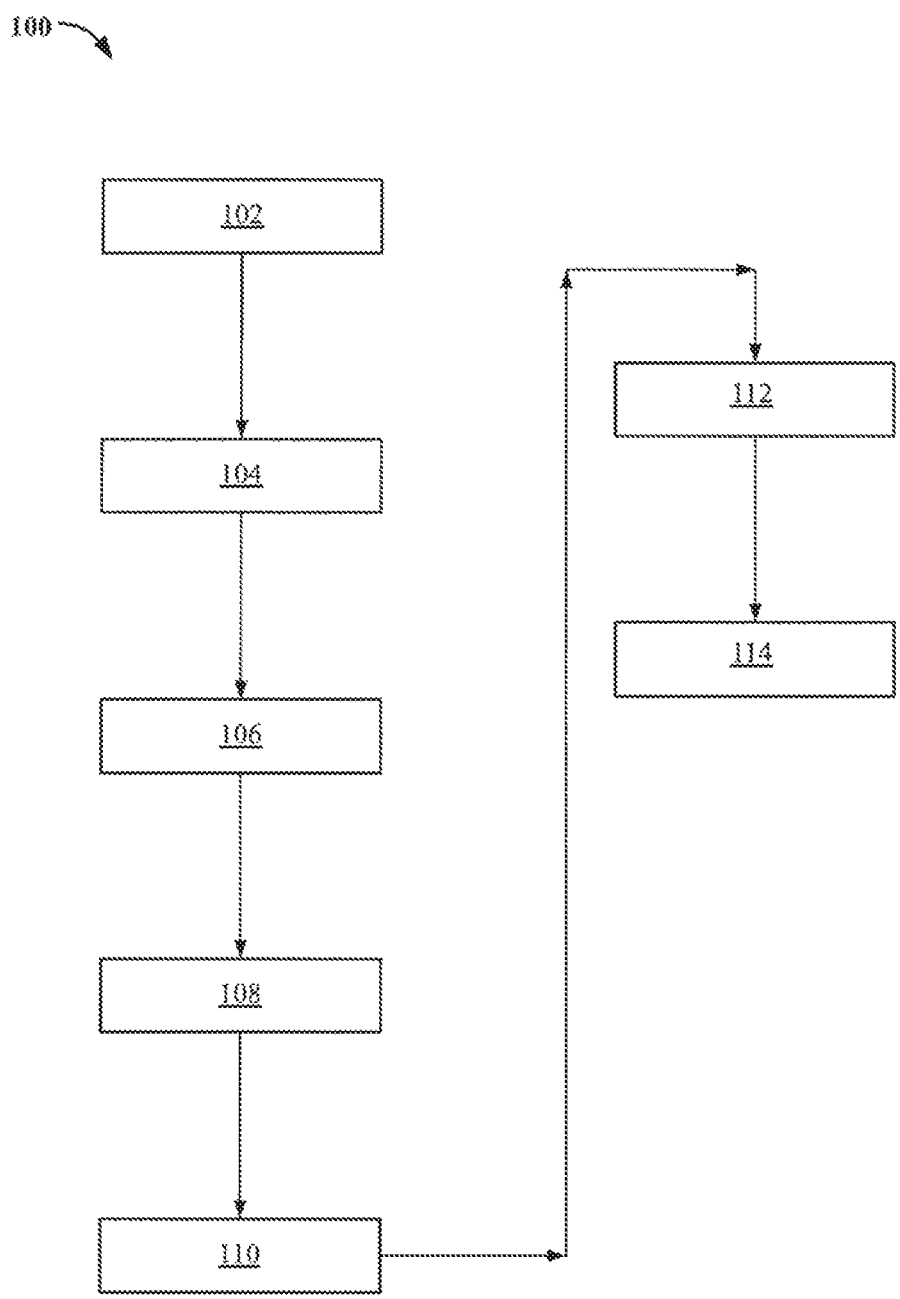
FIG. 3 presents a method of removing fluids from a subterranean well, according to the present disclosure.

FIGS. 1-3 provide illustrative, non-exclusive examples of a system and method for removing fluids from a subterranean well, according to the present disclosure, together with elements that may include, be associated with, be operatively attached to, and/or utilize such a method or system.

In FIGS. 1-3, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

In general, structures and/or features that are, or are likely to be, included in a given embodiment are indicated in solid lines in the figures, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

Although the approach disclosed herein can be applied to a variety of subterranean well designs and operations, the present description will primarily be directed to systems for removing fluids from a subterranean well employing rechargeable batteries.

Referring now to FIGS. 1-2, illustrated is one embodiment of a system 10 for removing fluids L from a subterranean well 12. The system 10 includes a housing 14, the housing 14 including a hollow cylindrical body 16, the hollow cylindrical body 16 having a first end 18 and a second end 20. The system 10 includes a pump 22 for removing fluids from the subterranean well 12, the pump 22 positioned within the hollow cylindrical body 16. Pump 22 includes an inlet end 24 and a discharge end 26. Pump 22 further includes at least one pumping element 25, such as an impeller, piston, or the like, intermediate inlet end 24 and discharge end 26.

System 10 also includes a battery-powered driver 28 for driving the pump 22. As shown in FIGS. 1-2, the driver 28 is positioned within the hollow cylindrical body 16. The driver 28 is operatively connected to pump 22 to drive the at least one pump impeller 25. To power battery-powered driver 28, a rechargeable battery 30 may be provided. In some embodiments, the rechargeable battery 30 may be positioned within the hollow cylindrical body 16. Rechargeable batteries having utility will be discussed in more detail below.

System 10 also includes an apparatus 32 for releasably securing and sealing the housing 14. As shown, in some embodiments, the apparatus 32 may be positioned within a tubular 72 of the subterranean well 12. In some embodiments, the apparatus 32 may be a docking station 34, as shown, which forms a mechanical connection with the first end 18 of the hollow cylindrical body 16. In some embodiments, apparatus 32 may be in the form of a packer (not shown). In some embodiments, apparatus 32 may be a portion of the housing 14, itself. Other forms of apparatus 32 may have utility herein, providing they meet the requirements of securing the housing 14 and sealing the first end 18 of the hollow cylindrical body 16. In some embodiments, the apparatus 32 may include a latching bumper spring 56.

In some embodiments, the system 10 may include a battery recharging station 38 In some embodiments, the battery recharging station 38 may be positioned above-ground GR, as shown in FIGS. 1-2. The term "above-ground GR" refers generally to any desirable and accessible charging location up-hole from the pump positioning device, such as a locating the recharging station (i) within the wellbore intermediate the surface and pump positioning depth, (ii) an earthen surface location, (iii) the seafloor, or on an operating platform or (iv) other convenient or necessary charging location. In some embodiments, battery recharging station 38 includes a receiver 40, which is structured and arranged to receive the housing 14 when the housing 14 is disengaged from the apparatus 32. In some embodiments, receiver 40 of battery recharging station 38 has an opening 42 at one end thereof, the opening 42 in communication with the tubular 72. As shown in FIG. 2, in some embodiments, the housing 14 is disengaged from the apparatus 32, transferred through the tubular 72 to the receiver 40 of battery recharging station 38 for charging. When positioned within the receiver 40, an electrical connection may be made with charger 44 and the rechargeable battery 30 is then charged.

In some embodiments, the system 10 may include a mobile charging unit 80 for charging the rechargeable battery 30 via cabling 84. In some embodiments, the mobile charging unit 80 may be installed in a vehicle 82, for convenience.

In some embodiments, the system 10 may include at least one sensor 46 for monitoring system conditions including the level of charge of the rechargeable battery 30. In some embodiments, the system 10 may include a communications system 48 for transmitting data obtained from the at least one sensor 46. In some embodiments, the communications system 48 transmits performance information to a supervisory control and data acquisition (SCADA) system (not shown).

Referring to FIG. 1, in some embodiments, the rechargeable battery 30 can be recharged via a downhole wet-mate connection 90 attached to wireline having multiple electrical conductors, or a slickline 92, with a larger power-source battery (not shown), attached to the wet-mate.

As may be appreciated by those skilled in the art, a slickline is a single-strand wire used to run tools into a wellbore. Slicklines can come in varying lengths, according to the depth of the wells in the area. It may be connected to a wireline sheave, which is a round wheel grooved and sized to accept a specified line and positioned to redirect the line to another sheave that will allow it to enter the wellbore while keeping the pressure contained.

The slickline power-source battery may be transported to the subterranean well 12 on a temporary basis, or remain on or near location, and be passively charged via renewable sources such as solar or wind, or fuel cells, hydrocarbon-fueled generators, etc.

In some embodiments, the wireline or slickline 92, or the power required for recharging, can be supplied by a mobile cable spooling and charging unit (not shown). This mobile spooling and charging unit can eliminate the requirement for permanent onsite power generation, as the unit could recharge rechargeable battery 30 of pump 22 while the pump 22 was in-place at its pumping position in the subterranean well 12, eliminating the need to wait for the pump 22 to return. The charging unit could use many different methods to produce electricity including, but not limited to, natural gas diesel generators, renewable sources, or fuel cells.

Referring again to FIGS. 1-2, in some embodiments, the system 10 may include a surfacing system 50 for raising the housing 14 to a position within the battery recharging station 38 when the housing 14 is disengaged from the apparatus 32.

In some embodiments, the housing 14 may be disengaged from the apparatus 32 in response to a signal received from the at least one sensor 46 that the rechargeable battery 30 has reached a predetermined level of discharge.

In some embodiments, the at least one sensor 46 for monitoring system conditions includes a sensor for monitoring downhole pressure 60, and a sensor for monitoring downhole temperature 62. In some embodiments, the downhole pressure sensor 60 provides a signal to a pump-off controller 64. In some embodiments, the at least one sensor 46 provides a signal to the pump 22 to change its operating speed to maintain an optimal fluid level above the pump.

In some embodiments, the surfacing system 50 is structured and arranged to raise and lower the density of the housing 14. In some embodiments, the surfacing system 50 comprises a buoyancy system. In some embodiments, the surfacing system 50 comprises a propeller system 66 or a jetting device (not shown).

Still referring to FIG. 2, in some embodiments, the pump 22 may be a positive-displacement pump. In some embodiments, the pump 22 is other than a positive-displacement pump. Suitable battery-powered pumps may be obtained from Hydro Leduc N.A., Inc., of Houston, Tex., USA, and others.

In some embodiments, the subterranean well 12 further includes a casing 70, the tubular 72 positioned within the casing 70 to form an annulus 52 for producing gas G therethrough, with liquids L removed by the pump 22 through the tubular 72. In some embodiments, a standing valve 54 may be provided, the standing valve 54 positioned within the tubular 72 to retain liquids within the tubular 72.

In some embodiments, the driver 28 includes an electric motor 58. As may be appreciated by those skilled in the art, the driver 28 may be sized according to the pumping requirements of a particular subterranean well 12. For example, to lift 18 barrels per day from 10,000 feet, true vertical depth (TVD), at 85% efficiency, the power requirements for a positive displacement pump may be on the order of about 2.0 kW to about 2.5 kW or about 2.25 kW.

In some embodiments, the battery for powering the driver 28 may be a rechargeable battery 30. As may be appreciated by those skilled in the art, due to downhole space limitations and the desire to minimize the need to recharge, energy density is an important factor when selecting a rechargeable battery 30 for use in the practice of the present disclosure. A comparison of typical energy densities employing current technology, both commercial and experimental is shown below.

TABLE 1

Energy Density Values for Selected Battery Technologies*

| Source | Type | Status | Power (kWh/L) | Length (ft) |
|---|---|---|---|---|
| Panasonic | Li-Ion | Existing | 0.8 | 37 |
| PolyPlus | Li-Air | Development | 1 | 29 |
| PolyPlus | Li-SW | Development | 1.5 | 20 |
| U. of Tokyo | Li-Ion | Experimental | 9.7 | 3 |

*Battery length is based upon a 2⅞" tubing diameter and a power requirement of 2.25 kW As is known by those skilled in the art, lithium-ion batteries belong to the family of rechargeable batteries in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the consistent components of a lithium-ion cell.

Lithium-ion batteries are one of the most popular types of rechargeable batteries for portable electronics, having a high energy density, no memory effect, and only a slow loss of charge when not in use. Besides consumer electronics, lithium-ion batteries are used by the military, electric vehicle and aerospace industries. Chemistry, performance, cost and safety characteristics vary across lithium-ion battery types. Consumer electronics typically employ lithium cobalt oxide ($LiCoO_2$), which offers high energy density. Lithium iron phosphate (LFP), lithium manganese oxide (LMO) and lithium nickel manganese cobalt oxide (NMC) offer lower energy density, but longer lives and inherent safety. Such batteries are widely used for electric tools, medical equipment and other roles. NMC in particular is a leading contender for automotive applications. Lithium nickel cobalt aluminum oxide (NCA) and lithium titanate (LTO) are additional specialty designs.

Lithium-ion batteries typically have a specific energy density range of: 100 to 250 Wh/kg (360 to 900 kJ/kg); a volumetric energy density range of: 250 to 620 Wh/L (900 to 1900 $J/cm^3$); and a specific power density range of: 300 to 1500 W/kg at 20 seconds and 285 Wh/l).

With regard to lithium/air batteries, those skilled in the art recognize that the lithium/air couple has a theoretical energy density that is close to the limit of what is possible for a battery (~10,000 Wh/kg). Recent advances directed to a protected lithium electrode (PLE) has moved the lithium/air battery closer to commercial reality. Primary Li/Air technology has achieved specific energies in excess of 700 Wh/kg. Rechargeable Li/Air technology is expected to achieve much higher energy densities than commercial Li-ion chemistry, since in a lithium/air battery, oxygen is utilized from the ambient atmosphere, as needed for the cell reaction, resulting in a safe, high specific energy power source.

The natural abundance, large gravimetric capacity (~1600 mAh/g) and low cost of sulfur makes it an attractive positive electrode for advanced lithium batteries. With an average voltage of about 2 V, the theoretical energy density of the Li—S couple is about 2600 Wh/l and 2500 Wh/kg. The electrochemistry of the Li—S battery is distinguished by the presence of soluble polysulfides species, allowing for high power density and a natural overcharge protection mechanism. The high specific energy of the Li—S battery is particularly attractive for applications where battery weight is a critical factor in system performance.

Lithium/seawater batteries have recently gained attention. While lithium metal is not directly compatible with water, the high gravimetric capacity of lithium metal, 3800 mA/g, and its highly negative standard electrode potential, Eo=−3.045 V, make it extremely attractive when combined as an electrochemical couple with oxygen or water. At a nominal potential of about 3 volts, the theoretical specific energy for a lithium/air battery is over 5000 Wh/kg for the reaction forming LiOH (Li+¼ $O_2$+½$H_2O$=LiOH) and 11,000 Wh/kg for the reaction forming $Li_2O_2$ (Li+$O_2$=$Li_2O_2$) or for the reaction of lithium with seawater, rivaling the energy density for hydrocarbon fuel cells and far exceeding Li-ion battery chemistry that has a theoretical specific energy of about 400 Wh/kg. The use of a protected lithium electrode (PLE) makes lithium metal electrodes compatible with aqueous and aggressive non-aqueous electrolytes. Aqueous lithium batteries may have cell voltages similar to those of conventional Li-ion or lithium primary batteries, but with much higher energy density (for $H_2O$ or $O_2$ cathodes).

The University of Tokyo experimental battery uses the oxidation-reduction reaction between oxide ions and peroxide ions at the positive electrode. Peroxides are generated and dispersed due to charge and discharge reactions by using a material made by adding cobalt (Co) to the crystal structure of lithium oxide ($Li_2O$) for the positive electrode. The University of Tokyo experimental battery can realize an energy density seven times higher than that of existing lithium-ion rechargeable batteries.

The oxidation-reduction reaction between $Li_2O$ and $Li_2O_2$ (lithium peroxide) and oxidation-reduction reaction of metal Li are used at the positive and negative electrodes, respectively. The battery has a theoretical capacity of 897 mAh per 1 g of the positive/negative electrode active material, a voltage of 2.87 V and a theoretical energy density of 2,570 Wh/kg.

The energy density is 370 Wh per 1 kg of the positive/negative electrode active material, which is about seven times higher than that of existing Li-ion rechargeable batteries using $LiCoO_2$ positive electrodes and graphite negative electrodes. The theoretical energy density of the University of Tokyo battery is lower than that of lithium-air batteries (3,460 Wh/kg).

In some embodiments, the rechargeable battery 30 is selected from lithium-ion, lithium-air, lithium-seawater, or an engineered combination of battery chemistries. In some embodiments, the rechargeable battery 30 comprises a plurality of individual batteries.

Referring to FIG. 3, in another aspect, provided is a method of removing fluids from a subterranean well 100, the subterranean well including a tubular positioned within a casing to form an annulus. The method includes 102, positioning a housing within the tubular, the housing comprising a hollow cylindrical body, the hollow cylindrical body having a first end and a second end; a pump positioned within the hollow cylindrical body; a battery-powered driver for driving the pump, the driver positioned within the hollow cylindrical body; a rechargeable battery for powering the driver, the rechargeable battery positioned within the hollow cylindrical body; 104, engaging the first end of the housing with an apparatus for securing and sealing the housing, the apparatus positioned within the tubular of the subterranean well; and 106 removing fluids from the subterranean well.

In some embodiments, the method further includes 108, receiving a signal from at least one sensor that the rechargeable battery has reached a predetermined level of discharge; and disengaging the housing from the apparatus in response thereto.

In some embodiments, the method further includes 110, raising the housing to a battery recharging station, the battery recharging station positioned above-ground and in communication with the tubular.

In some embodiments, the method further includes 112, returning the housing to the apparatus upon charging the rechargeable battery and 114, engaging the first end of the housing with the apparatus.

In some embodiments, the apparatus is structured and arranged to releasably engage the first end of the housing.

In some embodiments, the housing further comprises a communications system for transmitting data obtained from the at least one sensor.

In some embodiments, the housing further comprises a surfacing system for raising the housing to a battery recharging station when the housing is disengaged from the apparatus.

In some embodiments, a mobile charging unit, such as a vehicle with electrical generation capabilities, can recharge the battery through the recharging station when needed. This mobile charging unit can eliminate the requirement for permanent onsite power generation, as the unit could recharge the pump's battery on its return to surface. The charging unit could use many different methods to produce electricity including, but not limited to natural gas, diesel generators, renewable sources, or fuel cells.

In some embodiments, the rechargeable battery is selected from lithium-ion, lithium-air, lithium-seawater, or an engineered combination of battery chemistries. In some embodiments, the driver comprises an electric motor.

In some embodiments, the rechargeable battery can be recharged via a downhole wet-mate connection attached to wireline having multiple electrical conductors and/or slickline with a larger power-source battery attached to the wet-mate. The slickline power-source battery could be transported to the well on a temporary basis or remain on or near location and be passively charged via renewable sources such as solar or wind, or fuel cells, hydrocarbon-fueled generators, etc.

In some embodiments, the wireline or slickline, or the power required for recharging, can be supplied by a mobile cable spooling and charging unit. This mobile spooling and charging unit can recharge the rechargeable battery while the pump is in-place at its pumping position within the well, eliminating the need to wait on the pump to return. The charging unit could use many different methods to produce electricity including, but not limited to natural gas, diesel generators, renewable sources, or fuel cells. In still other embodiments the charging unit could be powered or recharged or by a stand-alone surface or remote charging system, such as using solar, wind, or other charging energy source to charge the charging unit.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

It is within the scope of the present disclosure that an individual step of a method recited herein may additionally or alternatively be referred to as a "step for" performing the recited action.

Illustrative, non-exclusive examples of apparatus, systems and methods according to the present disclosure have been presented. It is within the scope of the present disclosure that an individual step of a method recited herein, including in the following enumerated paragraphs, may additionally or alternatively be referred to as a "step for" performing the recited action.

INDUSTRIAL APPLICABILITY

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A system for removing fluids from a subterranean well, comprising:
    (a) a housing comprising a hollow cylindrical body, the hollow cylindrical body having a first end and a second end;
    (b) a pump for removing fluids from the subterranean well, the pump positioned within the hollow cylindrical body; and
    (c) a battery-powered driver for driving the pump, the driver positioned within the hollow cylindrical body;
    (d) a rechargeable battery for powering the driver, the rechargeable battery positioned within the hollow cylindrical body;
    (e) an apparatus for releasably securing and sealing the first end of the housing; and
    (f) a battery recharging station, the battery recharging station positioned above-ground and in communication with the tubular, the battery recharging station structured and arranged to receive the housing when the housing is disengaged from the apparatus.

2. The system of claim 1, wherein the apparatus is positioned within a tubular of the subterranean well.

3. The system of claim 2, wherein the subterranean well further includes a casing, the tubular positioned within the casing to form an annulus for producing gas therethrough, with liquids removed by the pump through the tubular.

4. The system of claim 1, further comprising a mobile charging unit for charging the rechargeable battery.

5. The system of claim 4, wherein the communications system transmits performance information to a supervisory control and data acquisition (SCADA) system.

6. The system of claim 1, further comprising at least one sensor for monitoring system conditions including the level of charge of the rechargeable battery.

7. The system of claim 6, further comprising a communications system for transmitting data obtained from the at least one sensor.

8. The system of claim 6, further comprising a surfacing system for raising the housing to a position within the battery recharging station when the housing is disengaged from the apparatus.

9. The system of claim 8, wherein the housing is disengaged from the apparatus in response to a signal received from the at least one sensor that the rechargeable battery has reached a predetermined level of discharge.

10. The system of claim 6, wherein the surfacing system is structured and arranged to raise and lower the density of the housing.

11. The system of claim 10, wherein the surfacing system comprises a buoyancy system.

12. The system of claim 6, wherein the surfacing system comprises a propeller system or jetting device.

13. The system of claim 1, wherein the pump is a positive-displacement pump.

14. The system of claim 1, further comprising a standing valve, the standing valve positioned within the tubular to retain liquids within the tubular.

15. The system of claim 1, wherein the rechargeable battery is selected from lithium-ion, lithium-air, lithium-seawater, or an engineered combination of battery chemistries.

16. The system of claim 1, wherein the rechargeable battery comprises a plurality of individual batteries.

17. The system of claim 1, wherein the at least one sensor for monitoring system conditions includes a sensor for monitoring downhole pressure, and a sensor for monitoring downhole temperature.

18. The system of claim 17, wherein the downhole pressure sensor provides a signal to a pump-off controller.

19. The system of claim 17, wherein the at least one sensor provides a signal to the pump to change its operating speed to maintain an optimal fluid level above the pump.

20. The system of claim 1, further comprising a downhole wet-mate connection attached to a wireline or a slickline for recharging the rechargeable battery.

21. The system of claim 20, wherein the wireline, slickline or power required for recharging is provided by a mobile cable spooling or charging unit.

22. A method of removing fluids from a subterranean well, the subterranean well comprising a tubular positioned within a casing to form an annulus, the method comprising:
  positioning a housing within the tubular, the housing comprising;
    (a) a hollow cylindrical body, the hollow cylindrical body having a first end and a second end;
    (b) a pump positioned within the hollow cylindrical body;
    (c) a battery-powered driver for driving the pump, the driver positioned within the hollow cylindrical body;
    (d) a rechargeable battery for powering the driver, the rechargeable battery positioned within the hollow cylindrical body;
    (e) an apparatus for releasably securing and sealing the first end of the housing; and
    (f) a battery recharging station, the battery recharging station positioned above-ground and in communication with the tubular, the battery recharging station structured and arranged to receive the housing when the housing is disengaged from the apparatus;
  engaging the first end of the housing with the apparatus for securing and sealing the housing;
  recharging the battery when the housing is engaged with the battery recharging station; and
  removing fluids from the subterranean well.

23. The method of claim 22, wherein the housing further comprises a rechargeable battery for powering the driver, the rechargeable battery positioned within the hollow cylindrical body.

24. The method of claim 23, wherein the apparatus is structured and arranged to releasably engage the first end of the housing.

25. The method of claim 24, wherein the housing further comprises at least one sensor for monitoring at least the level of charge of the rechargeable battery.

26. The method of claim 25, wherein the housing further comprises a communications system for transmitting data obtained from the at least one sensor.

27. The method of claim 26, wherein the housing further comprises a surfacing system for raising the housing to a battery recharging station when the housing is disengaged from the apparatus.

28. The method of claim 27, further comprising receiving a signal from the at least one sensor that the rechargeable battery has reached a predetermined level of discharge; and disengaging the housing from the apparatus in response thereto.

29. The method of claim 28, further comprising raising the housing to a battery recharging station.

30. The method of claim 29, further comprising positioning the recharging station in proximity to a surface end of the well, a seafloor location of the well, and a subterranean location of the well intermediate the surface end of the well and a downhole pumping location of the well.

31. The method of claim 29, further comprising returning the housing to the apparatus upon charging the rechargeable battery and engaging the first end of the housing with the apparatus.

32. The method of claim 23, wherein the rechargeable battery is selected from lithium-ion, lithium-air, lithium-seawater, or an engineered combination of battery chemistries.

33. The method of claim 23, further comprising the step of recharging the rechargeable battery through the use of a downhole wet-mate connection attached to a wireline or a slickline.

34. The method of claim 33, wherein the wireline, slickline or power required for recharging is provided by a mobile cable spooling or charging unit.

35. The method of claim 22, wherein removing fluids from the well further comprises producing hydrocarbons from the well.

* * * * *